United States Patent [19]

Isselmann

[11] 4,298,392

[45] Nov. 3, 1981

[54] ACCELERATOR FOR SETTING OF CEMENTS

[75] Inventor: Piet H. Isselmann, Uithoorn, Netherlands

[73] Assignee: Akzona Incorporated, Asheville, N.C.

[21] Appl. No.: 156,824

[22] Filed: Jun. 5, 1980

[30] Foreign Application Priority Data

Jun. 11, 1979 [NL] Netherlands .......................... 7904551

[51] Int. Cl.³ .............................................. C04B 7/02
[52] U.S. Cl. ........................................ 106/98; 106/315
[58] Field of Search ..................... 106/89, 98, 315, 314

[56] References Cited

U.S. PATENT DOCUMENTS

3,131,075  4/1964  Brooks .................................. 106/98

FOREIGN PATENT DOCUMENTS

578716  6/1933  Fed. Rep. of Germany ...... 106/315
2611419  9/1977  Fed. Rep. of Germany ...... 106/315

*Primary Examiner*—James Poer
*Attorney, Agent, or Firm*—Francis W. Young; Robert F. Green

[57] ABSTRACT

The present disclosure relates to a class of additives for hydraulic cement which accelerate the setting of the cement. More particularly the present invention relates to an additive for Portland cement comprising a silica sol and one or more rhodanides and to cementitious compositions containing such additives.

12 Claims, 13 Drawing Figures

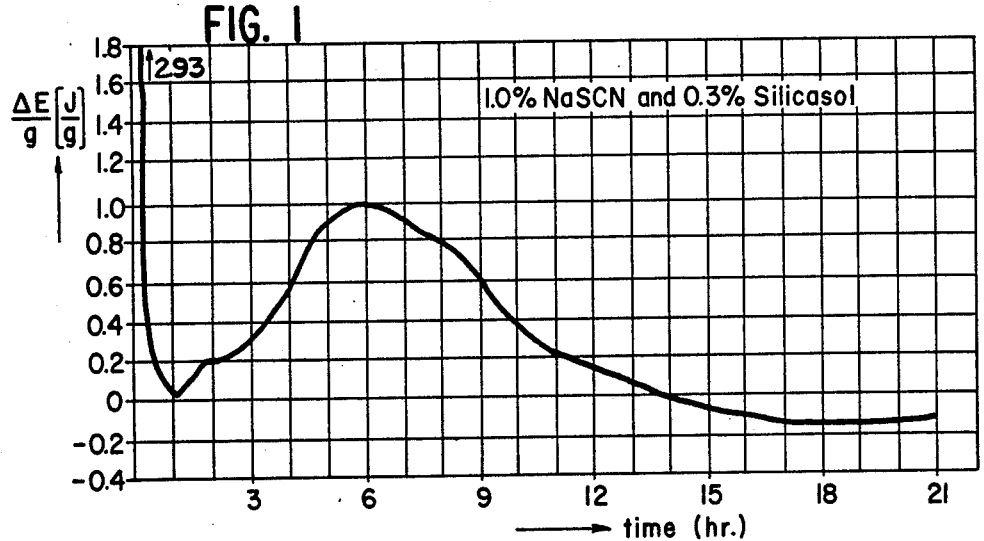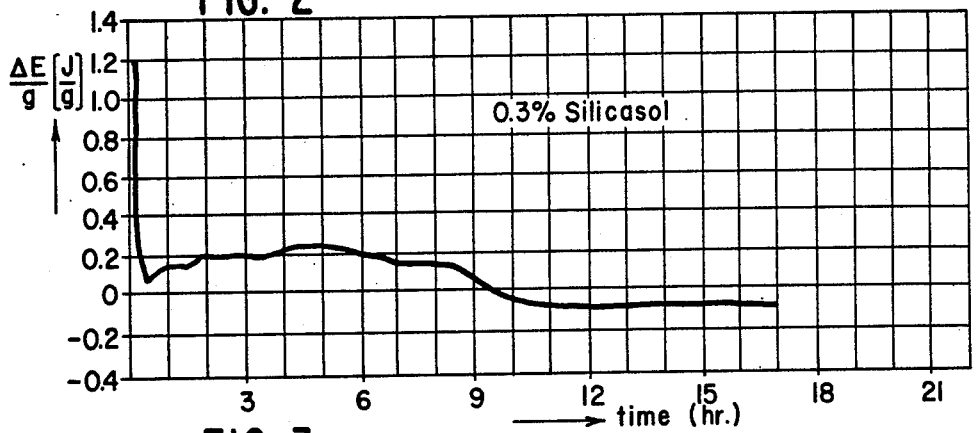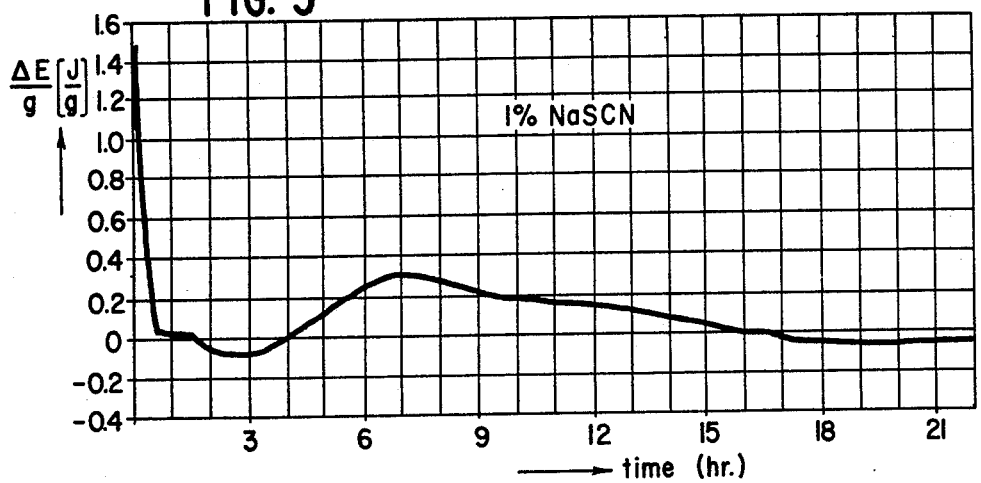

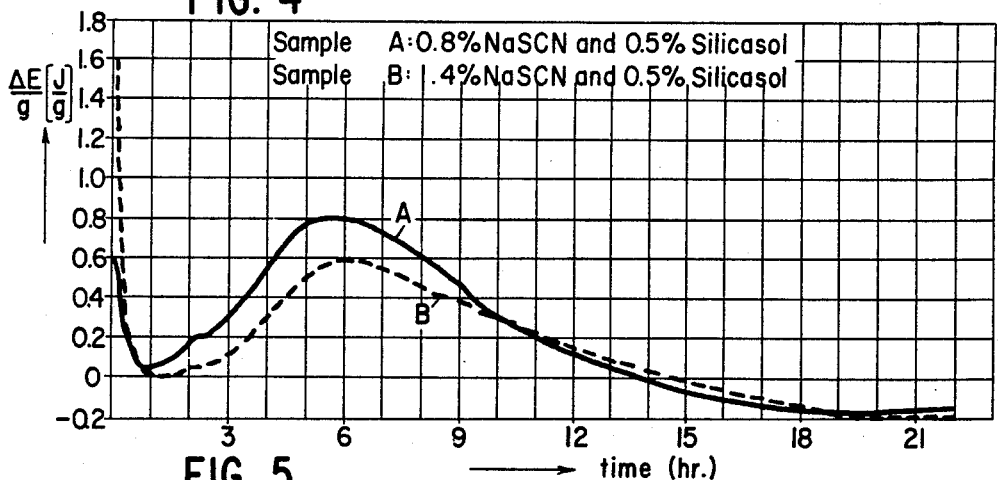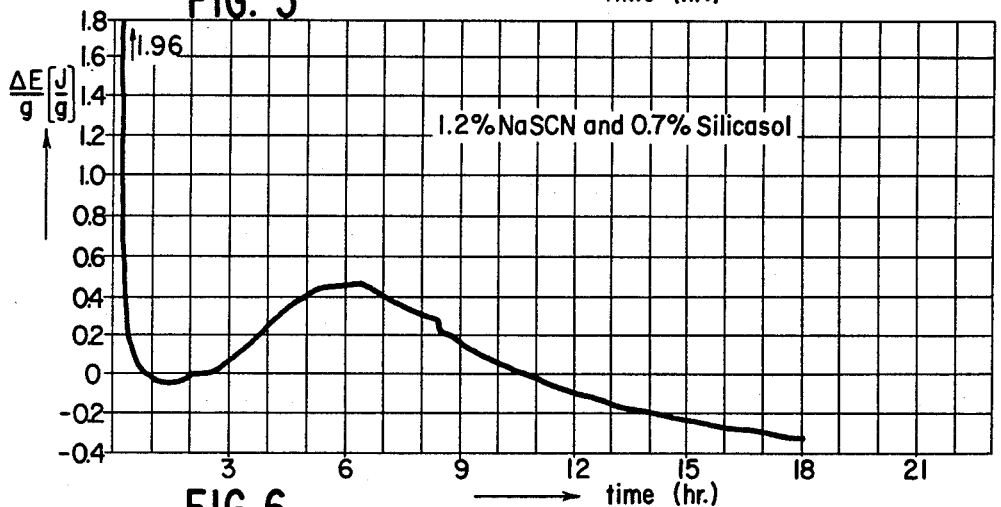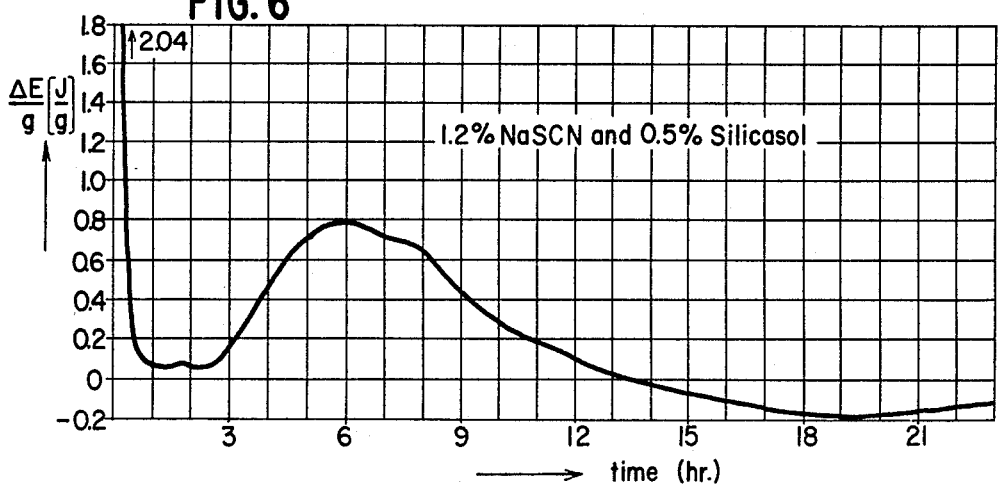

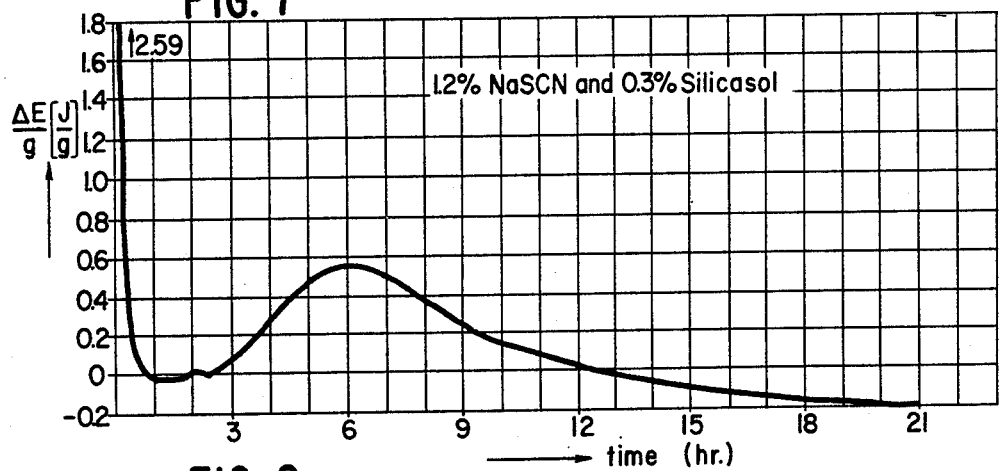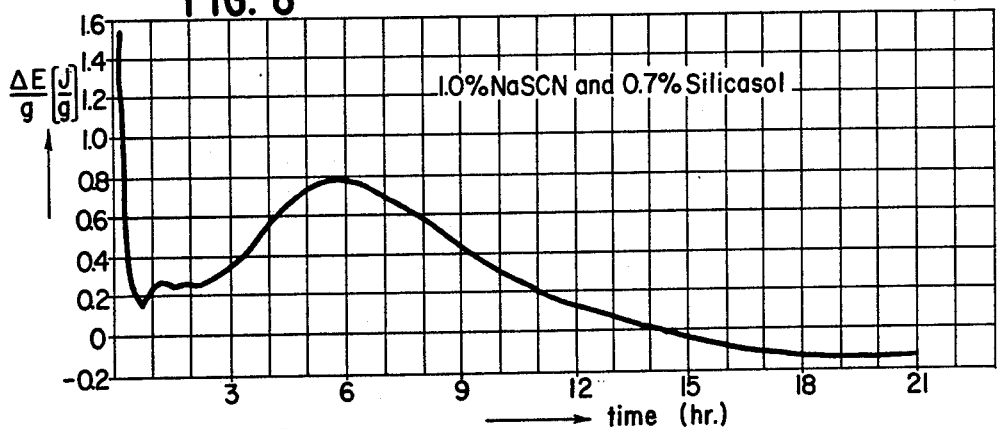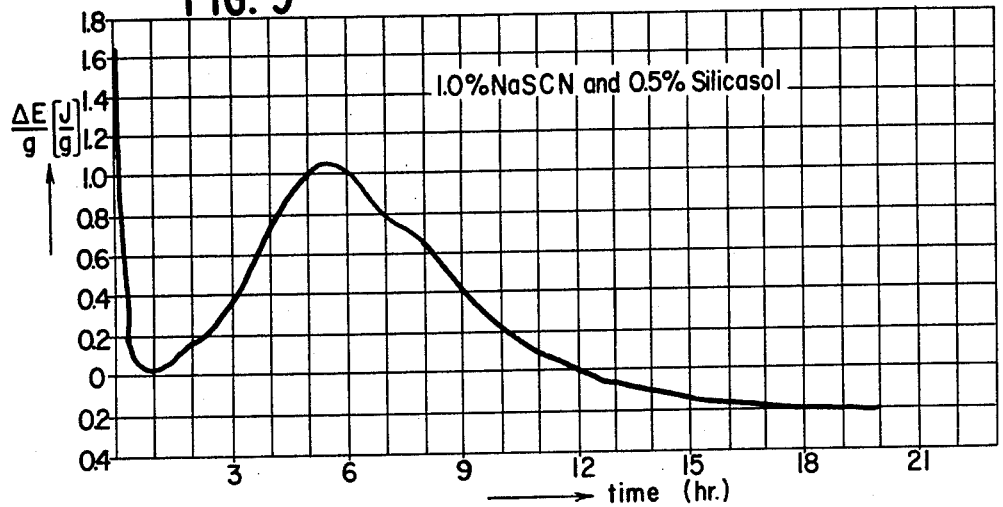

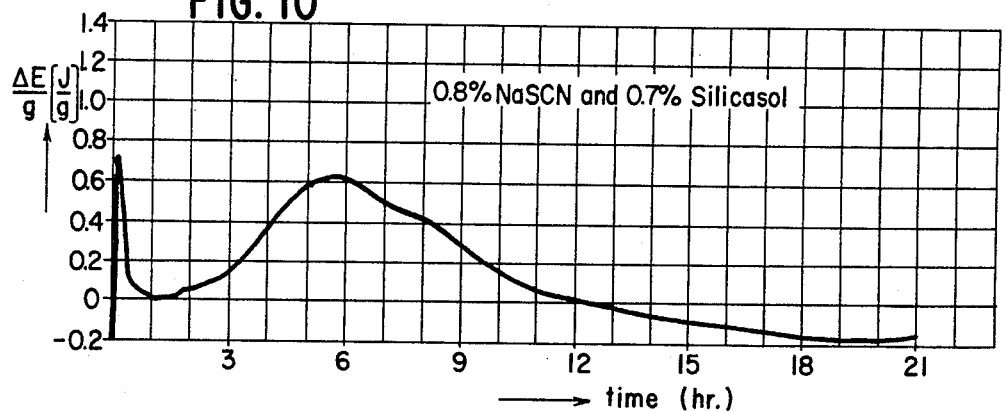
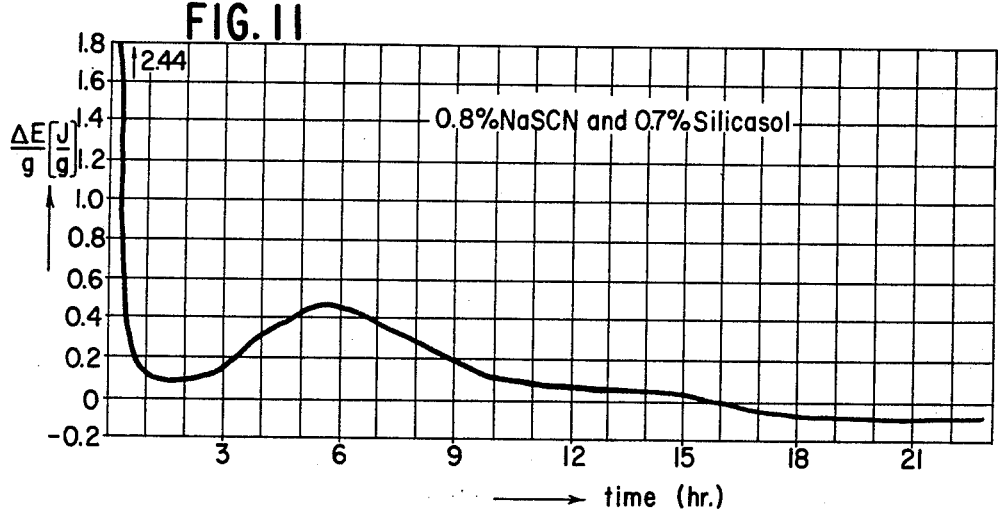

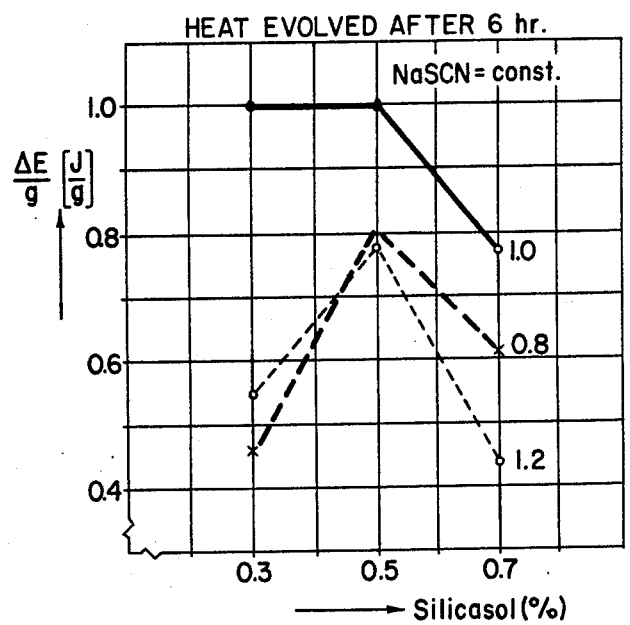
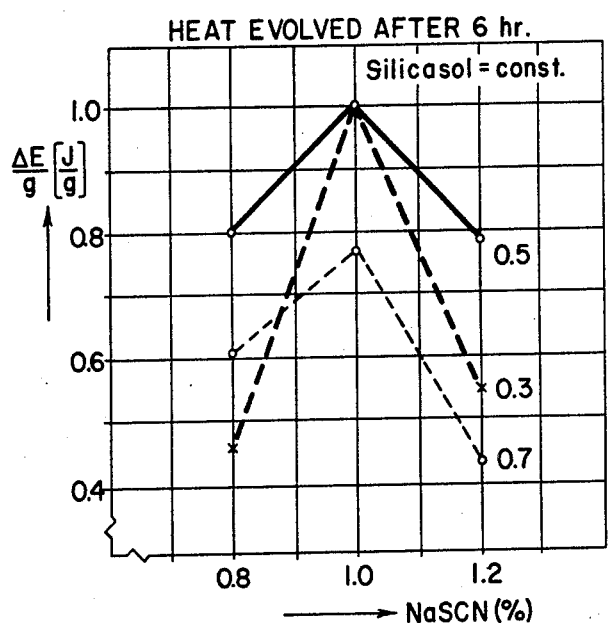

ACCELERATOR FOR SETTING OF CEMENTS

The present invention relates to a class of additives for hydraulic cement, which accelerate the setting of the cement. More particularly, the present invention relates to an additive for Portland cement comprising a silica sol and one or more rhodanides and to cementitious compositions containing such additives.

BACKGROUND OF THE INVENTION

Accelerated setting, that is the accelerated binding and/or hardening of hydraulic cements in general and Portland cement in particular, may be obtained by means of external heating or by the addition of an accelerator to the concrete mix. Since the equipment required and the actual generation process for external heating techniques is expensive and not always feasible for on-the-job conditions, it is common practice in the art to employ chemical additives as accelerators in concrete mix. Generally, calcium chloride is used as an accelerator because of its low cost and effectiveness.

The widespread use of concrete in contact with metal, particularly with the advent of large-scale use of pre-stressed, post-stressed and reinforcing steel in structural concrete, has given rise to corrosion problems. While calcium chloride is effective in accelerating the setting of cement, it is used with reluctance, if at all, in applications where concrete is in contact with metal, such as for example, in reinforced and pre-stressed concrete, because it corrodes the metal which it contacts or which is embedded in the concrete. Chloride ions exhibit corrosiveness towards metals and steel in particular, in the presence of concrete if the quality of the concrete is low, if the steel is improperly embedded, or if the concrete is of the high slump variety. Also, corrosion may result in concrete containing calcium chloride if air or water gain access to the steel through porous concrete or through voids under steel bars or cables embedded in the concrete.

The present invention provides for a class of additives for hydraulic cement which is as effective as calcium chloride in the binding and/or hardening of the cement without the corrosion promoting properties of calcium chloride.

DESCRIPTION OF THE INVENTION

In accordance with the present invention, additives comprising a silica sol and one or more rhodanide compounds of the formula $$R-S-C\equiv N \qquad (I)$$

wherein for each compound, R is independently selected from the class consisting of alkali metals and alkaline earth metals are effective in accelerating the setting of hydraulic cement. In particular, the present invention relates to a class of additives which are effective in accelerating the binding and/or hardening of Portland cement and to cementitious compositions containing such additives.

As used herein, the term "alkali metals" refers to lithium, sodium, potassium, rubidium, cesium and francium. As used herein the term "alkaline earth metals" refers to beryllium, magnesium, calcium, strontium, and barium.

It is preferred that R in the compounds of formula (I) is sodium and/or calcium. It is most preferred that R is sodium. The weight ratio of the amount of the compounds of formula (I) to the amount of silica sol in the additives of the present invention is dependent on various factors such as, for example, the type of cement and the specification of the silica sol. Although the ratio may vary, it is within the scope of one of ordinary skill in the art to determine for a given system the optimum weight ratio.

It has been found that when used for Portland cement an additive comprising one or more compounds of formula (I) and silica sol having a weight ratio in the range of 1:2 to 5:1, is effective. The amount of silica sol employed is calculated as silicon dioxide ($SiO_2$). It is preferred that the weight ratio between the amount of compounds of formula (I) and the amount of silica sol calculated as $SiO_2$ in a range of 4:1 to 1:1 be employed. It is most preferred that a weight ratio between the amount of compounds of formula (I) and the amount of silica sol calculated as $SiO_2$ in a range of 3.5:1 and 1.5:1 be employed.

The additives of the present invention are used in cement or concrete mix in amounts ranging between about 0.03% to 4.0% by weight of the dry cement weight. It is preferred that the amount of additive employed range between 1% to 3% by weight of the dry cement weight with a range of 1.05% to 1.55% being most preferred. It should be understood, that additives in amounts in excess of 4% may be used but generally are not economically practical. It is preferred that the amount of silica sol, calculated as silicon dioxide ($SiO_2$) should not be more than 0.5% by weight of the dry cement weight and it is most preferred to have a range between 0.25% to 0.35% by weight of the dry cement weight. It is preferred that a corresponding amount of compounds of formula (I) in a range of 0.8% to 1.2% by weight of the dry cement weight be employed.

The compounds of formula (I) and the silica sol may be added separately or preferably in the form of an aqueous mixture to the mixing water or at a later stage during mixing. To avoid gelation, the additive mixture may be prepared in accordance with the following procedure:

An aqueous solution of silica sol is added, with stirring, to a solution containing compounds of formula (I), so that a solution is obtained having a solids content of about 20% by weight. A thickening agent, such as for example, sodium alginate is added in an amount of about 0.3% by weight, calculated on the solids content.

The silica sols that may be employed within the scope of the invention are commercially available. The silica sols are generally aqueous colloidal solutions containing a low percentage of alkali. The silica sols mostly contain up to 50, and preferably 30 to 40 percent by weight of $SiO_2$. Such silica sols generally have a specific surface area between 60 and 600, and preferably between 100 and 250 $m^2/g$ determined in accordance with the BET method. The silica sols to be used within the scope of the invention can generally be obtained in accordance with one or more of the processes described in the U.S. Pat. Nos. 2,457,971, 2,574,902, 2,650,200, 2,668,149 and 3,650,977.

The cementitious compositions may contain ingredients other than the additives of the present invention, such as, for example, plastifiers and air-entraining agents.

The term "hydraulic cement" as used herein refers to those cements that are capable of setting and hardening by interacting water the the constituents of the cement.

Representative of the class of hydraulic cements is Portland cement which is comprised essentially of calcium silicate. A common Portland cement comprises $3CaO.SiO_2$ and $2CaO.SiO_2$, and a lesser amount of calcium aluminate, $3CaO.Al_2O_3$. Portland cements are produced by heating an intimate mixture of finely divided calcareous material (limestone) and argillaceous material (clay) to fusion to form a clinker. The clinker is pulverized with the addition of about 2% of gypsum, or some other form of calcium sulfate, to obtain desired setting qualities in the finished cement. Small amounts of other substances may be added during grinding to impart special properties to the product.

The invention will be further described in the following examples. These are, of course, merely meant to illustrate the invention and are not to be regarded as any limitation thereon. The percent by weight of the compounds of the additives employed in the following examples is calculated based on the dry cement weight employed.

EXAMPLE 1

The binding rate of a cement containing the additives of the present invention was compared with that of the same cement to which no additive had been added. The difference in the evolving heat of hydration, is plotted as a function of time in order to illustrate the difference in binding rate of the samples tested. In the tests in this Example a microcalorimeter was employed to measure the heat of hydration. In the microcalorimeter are two measuring chambers. For each test run, 5 g. of cement was placed into each chamber. During the entire test period the measuring chambers were placed in a water vessel which was kept at a constant temperature of 25° C. or in a conditioned space of 6° C. Each measuring chamber contained a few thermistors interconnected to form a Wheatstone Bridge. The measuring chambers containing the cement samples were placed into the water tank and, the system was allowed to thermally equilibrate for about one hour in order to permit setting of the signal of the Wheatstone Bridge to zero. To the measuring chamber was then added with the aid of a syringe, mixing water (2.5 g per 5 g of cement) and an additive of the present invention. The experiments were carried out with 0.3, 0.5 and 0.7% by weight of silica sol (calculated as $SiO_2$) and 0.8, 1.0 and 1.2% by weight of sodium thiocyanate. A cement in accordance with the German Industrial Standard (DIN) 1164, viz. a Portland cement 45F corresponding to Portland cement C was employed. The silica sol had a specific surface area of 150 $m^2/g$ (determined in conformity with the BET method). The results are shown in the following graphs (FIGS. 1-11).

FIGS. 1-3 illustrate the fact that an additive containing silica sol and sodium thiocyanate evolves a greater heat of hydration and thereby faster hydration rate than do additives containing only silica sol or sodium thiocyanate.

FIGS. 4-11 illustrate the rate of hydration for additives containing varying amounts of silica sol and sodium thiocyanate.

FIG. 12 illustrates the effect on the hydration rate when the amount of silica sol is varied in the additive and the amount of sodium thiocyanate is kept constant at the levels of 0.8, 1.0 and 1.2% by weight of the dry cement.

FIG. 13 illustrates the effect on the hydration rate when the amount of sodium thiocyanate is varied in the additive and the amount of silica sol is kept constant at the levels of 0.3, 0.5 and 0.7% by weight of the dry cement.

EXAMPLE II

A number of batches of mortar were prepared from Portland cement. The sample batches contained respectively no auxiliary substance; 1.5% by weight of calcium chloride, 1.5% by weight of sodium thiocyanate; and 1.0% by weight of sodium thiocyanate and 0.5% by weight of silica sol (calculated as $SiO_2$) having a specific surface area of 150 $m^2/g$. The binding temperature was 6° C. and the water-cement factor was 0.5. For each batch of mortar a number of test bars were made. The workform was removed after 24 hours and the compressive strength was then measured in accordance with the German Industrial Standard (DIN) 1164, after 16, 24, and 72 hours. The results are given in Table I:

TABLE I

| ADDITIVE | TIME (hrs.) | COMPRESSIVE STRENGTH (Pa $\times$ $10^6$) |
| --- | --- | --- |
| control | 16 | 1.2 |
|  | 24 | 3.0 |
|  | 72 | 24.0 |
| calcium chloride (1.5%) | 16 | 3.5 |
|  | 24 | 8.0 |
|  | 72 | 32.0 |
| sodium thiocyanate (1.5%) | 16 | 1.7 |
|  | 24 | 4.5 |
|  | 72 | 30.0 |
| sodium thiocyanate (1.0%) + silica sol (0.5%) | 16 | 2.8 |
|  | 24 | 7.0 |
|  | 72 | 28.0 |

The results in Table I illustrate that the additive of this invention accelerates the setting of cement especially within the first 24 hrs. of the binding period.

EXAMPLE III

A number of mortar prisms were prepared from Portland cement C containing respectively no auxiliary substance; 1.5% by weight of calcium chloride; and 1.0% by weight of sodium thiocyanate and 0.5% by weight of silica sol (type A, B or C). The binding temperature was 6° C. and the water-cement factor was 0.5. The type A silica sol was 40%-silica sol stabilized with ammonium and having a specific surface area of 150 $m^2/g$. The type B silica sol was a silica sol stabilized with aluminium and having a specific surface area of 300 $m^2/g$. The type C silica sol was a silica sol stabilized with ammonium and having a specific surface area of 400 $m^2/g$. The compressive strength was measured in accordance with the German Industrial Standard (DIN) 1164 and the results are given in Table II.

TABLE II

| ADDITIVE | TIME (hrs.) | COMPRESSIVE STRENGTH (Pa $\times$ $10^6$) |
| --- | --- | --- |
| control | 16 | 1.7 |
|  | 24 | 3.9 |
|  | 72 | 20.0 |
| calcium chloride (1.5%) | 16 | 4.6 |
|  | 24 | 9.0 |
|  | 72 | 30.0 |
| sodium thiocyanate (1.0%) + type A silica sol (0.5%) | 16 | 3.4 |
|  | 24 | 8.7 |
|  | 72 | 29.0 |
| sodium thiocyanate (1.0%) + type B silica sol (0.5%) | 16 | 3.6 |
|  | 24 | 9.0 |
|  | 72 | 35.0 |
| sodium thiocyanate (1.0%) + type C silica sol (0.5%) | 16 | 4.0 |
|  | 24 | 9.5 |

TABLE II-continued

| ADDITIVE | TIME (hrs.) | COMPRESSIVE STRENGTH (Pa × 10⁶) |
|---|---|---|
| | 72 | 32.0 |

From the results in Table II it is evident that when an additive of the present invention is employed in a cement rate, the acceleration of the binding rate is approximately the same order of magnitude obtained when an equivalent amount by weight of calcium chloride is employed as the accelerator. It can further be noted that the type of silica sol has little, if any influence, on the acceleration of the binding rate.

What is claimed is:

1. An additive for hydraulic cement comprising of a silica sol and one or more compounds of the formula $$R-S-C\equiv N$$

wherein for each compound, R is independently selected from the class consisting of alkali metals and alkaline earth metals.

2. An additive according to claim 1 wherein for each compound of the formula $$R-S-C\equiv N$$

R is independently selected from the group consisting of calcium and sodium.

3. An additive according to claim 2 wherein R is sodium.

4. An additive according to claim 1 or 2 wherein the weight ratio between the amount of compounds of the formula $$R-S-C\equiv N$$

and the amount of silica sol, calculated as SiO₂ is in the range of 1:2 to 5:1.

5. An additive according to claim 4 wherein the weight ratio between the amount of compounds of the formula $$R-S-C\equiv N$$

and the amount of silica sol, calculated as SiO₂ is in the range of 4:1 to 1:1.

6. An additive according to claim 5 wherein the weight ratio between the amount of compounds of the formula $$R-S-C\equiv N$$

and the amount of silica sol, calculated as SiO₂ is in the range of 3.5:1 to 1.5:1.

7. A cementing composition comprising of a hydraulic cement and an additive comprising of a silica sol and one or more compounds of the formula $$R-S-C\equiv N$$

wherein for each compound, R is independently selected from the class consisting of alkali metals and alkaline earth metals.

8. A cementing composition according to claim 7 wherein the hydraulic cement is Portland cement.

9. A cementing composition according to claim 8 containing from 0.3% to 4.0% by weight of the hydraulic cement of an additive calculated as the sum of the amount of silica sol, calculated as SiO₂ and the amount of compounds of the formula $$R-S-C\equiv N$$

10. A cementing composition according to claim 9 containing from 0.25% to 0.35% by weight of the hydraulic cement of an amount of silica sol calculated as SiO₂ and from 0.8% to 1.2% by weight of an amount of compounds of the formula $$R-S-C\equiv N$$

11. A cementing composition according to claim 10 wherein for each compound of the formula $$R-S-C\equiv N$$

R is independently selected from the group consisting of calcium and sodium.

12. A cementing composition according to claim 11 wherein R is sodium.

* * * * *